United States Patent [19]

Traeger et al.

[11] 4,260,217

[45] Apr. 7, 1981

[54] PANORAMIC PERISCOPE

[75] Inventors: Rolf Traeger; Dieter Marx, both of Aalen; Helmut Knutti, Oberkochen, all of Fed. Rep. of Germany

[73] Assignee: Carl Zeiss-Stiftung, Oberkochen, Fed. Rep. of Germany

[21] Appl. No.: 948,965

[22] Filed: Oct. 5, 1978

[30] Foreign Application Priority Data

Oct. 13, 1977 [DE] Fed. Rep. of Germany ....... 2746076

[51] Int. Cl.³ .................. G02B 23/10; G02B 23/12; G02B 13/16
[52] U.S. Cl. ..................... 350/1.2; 350/10; 350/34; 350/39
[58] Field of Search .................. 350/1.2, 20, 22, 52, 350/39, 34; 250/213 R, 213 VT

[56] References Cited

U.S. PATENT DOCUMENTS

| 2,237,943 | 4/1941 | Lihotzky ...................... 350/39 |
| 3,464,757 | 9/1969 | Schmidt et al. ............. 350/1.2 |
| 3,549,231 | 12/1970 | Scidmore et al. ............ 350/52 |
| 3,868,504 | 2/1975 | Anderson .................. 250/213 VT |
| 4,037,921 | 7/1977 | Cox ....................... 250/213 R |

FOREIGN PATENT DOCUMENTS 2232516  1/1976  Fed. Rep. of Germany ............. 350/52

*Primary Examiner*—Jon W. Henry
*Attorney, Agent, or Firm*—Stonebraker, Shepard & Stephens

[57] ABSTRACT

A panoramic periscope with a daylight viewing optical system and a heat-picture optical system, and a mirror behind the front entrance window of the periscope, the mirror being movable both in elevation and in azimuth. Moreover, in each optical system there are alternative components selectively usable, and preferably mounted on a turret, which enable either system to operate at two different magnification scales.

1 Claim, 5 Drawing Figures

PANORAMIC PERISCOPE

The present invention relates to a panoramic periscope provided with both a daytime-viewing optical system and a heat-picture or infra-red optical system, with provision for selectively using either system as desired.

A nighttime viewing instrument with optical systems associated with two different wavelength ranges is known from German Pat. No. 2,232,516. In this known apparatus, a front window which is transparent in concentric regions for two spectral ranges is provided for the incoming radiation and the two different wavelength ranges have a common optical axis until impingement on an elevation mirror associated with them, arranged behind the front window. The night-viewing instrument makes possible the simultaneous observation of a spectral range of about 0.4–13.5 μm wavelength. There is the disadvantage, however that two elevation mirrors must be adjusted. No detailed information is given as to the obtaining of the simultaneity of the observation.

An object of the present invention is to obtain a coaxial arrangement of the day-viewing optical system and the heat-picture optical system with a single elevation mirror, and to make it possible to observe these two spectral ranges from one position.

SUMMARY OF THE INVENTION

This object is achieved in accordance with the invention by providing for the oncoming rays a front closure window which transmits both spectral ranges, and arranging behind the closure window a reflector mirror which is movable in elevation and azimuth, said mirror reflecting the radiation perpendicularly on the front objective of the heat-picture optical system and on the entrance objective of the daylight-viewing optical system. The entrance objective of the heat-picture optical system consists of a material which is transparent to the wavelength range of 8 μm to 14 μm and, for the passage of the visible range of the spectrum, is provided with a concentric borehole which serves as entrance pupil for the following heat-picture optical system.

In one advantageous illustrative embodiment of the invention, different imaging scales are possible by means of replaceably arranged optical parts for the two optical systems.

One suitable illustrative example is characterized by the fact that the daylight-viewing optical system consists, for high magnification, of a 90° deviating prism with front objective arranged behind it and a Schmidt prism. For small magnification, the daylight-viewing optical system consists of a Keplerian telescope having a lens reversal system and a front diaphragm.

The heat-picture optical system consists, in case of a large magnification scale, of a germanium Galilean telescope whose converging front objective is provided with a hole and whose diverging lens is fixed on an IR scanner which scans the image field two-dimensionally, an IR imaging lens and IR detector being provided behind the scanner as well as a light-emitting diode array which throws an image of the object emitting the heat radiation, for the observation of which object a telescopic magnifier is provided. For a small magnification scale a second collecting IR objective is provided for the heat-picture optical system, which objective forms a second Galilean telescope with the diverging lens and for which the borehole in the first condensing objective serves as aperture stop and entrance pupil.

The optical parts which are to be replaced in order to change the imaging scale are preferably arranged in a switchable objective turret which is guided in precision ball bearings in order to assure precision in aiming.

In one suitable embodiment of the invention, the target image thrown by the daylight-viewing optical system is viewed through the one ocular of a dual ocular observation tube, or alternatively the target image thrown by the heat-picture optical system is viewed through the other ocular.

Target marks are advantageously provided to be mirrored into the observation beam paths.

The advantages obtained with the invention consist, in particular, of the compact construction of the instrument in which various components are integrated in a single instrument in order to obtain high efficiency.

BRIEF DESCRIPTION OF THE DRAWINGS

One preferred embodiment of the invention is shown in the drawings, in which:

FIG. 2c is a section along the line A—B of FIG. 2a.

DESCRIPTION OF THE PREFERRED EMBODIMENT

Figure 1A:
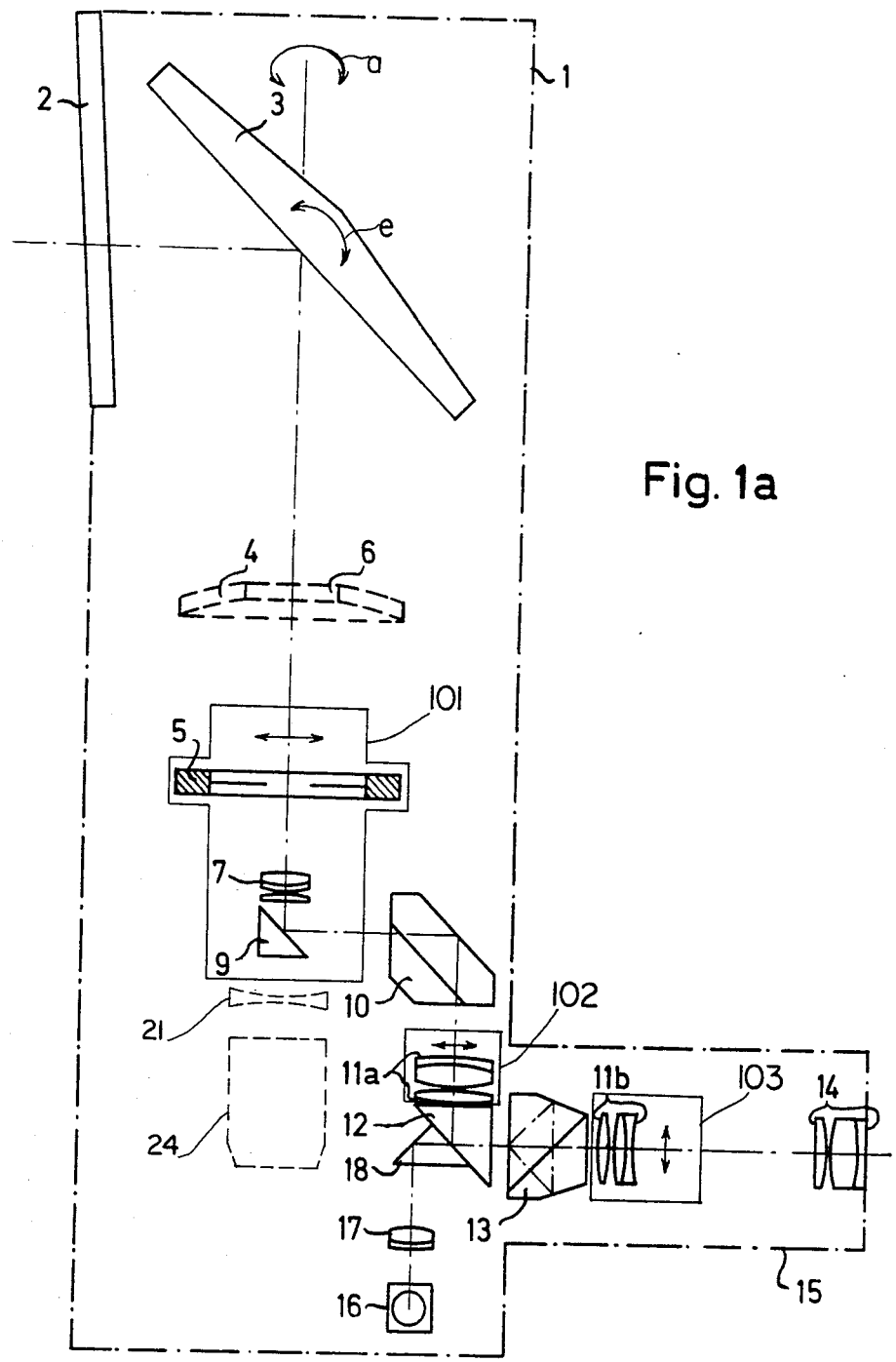
FIG. 1a is a section through the periscope of the invention, showing a weakly magnifying daylight-viewing optical system.

In the drawing, 1 is the housing of the periscope. The front window or closure which is transparent to both spectral ranges is designated 2; the reflector mirror 3 is movable both in elevation as indicated schematically by the arrow e and in azimuth as indicated schematically by the arrow a. The reflector mirror 3 is gyroscopically stabilized and deflects the radiation received perpendicularly onto the entrance objective corresponding to the magnification in question. Between the reflector mirror and the entrance objective of the magnification in question for the daylight-viewing optical system the front objective 4 for the heat-picture optical system and a front diaphragm 5 are arranged. The front objective 4 for the heat-picture optical system consists of germanium and is provided with a central hole 6. The rays contributing to the daylight-viewing image pass through the hole 6 and, after going through the front diaphragm 5, impinge upon the entrance objective of the daylight-viewing optical system.

In the case of the optical system for weak magnification, the entrance objective is designated 7, and in the case of the optical system for strong magnification it is designated 20. In the system for weak magnification, the deviating prisms 9 and 10 are provided. The prism 10 is developed as a roof prism and deflects the rays onto the erecting objective 11a of an erecting lens system. After repeated deflection on a 90° prism 12, the rays strike the Schmidt prism 13, for correction of the image tumbling upon azimuth rotation of the reflector head, in connection with which the mirror 3 is also turned. The erecting objective 11b arranged behind the Schmidt prism produces an image which is viewed with the right ocular 14 of a binocular tube 15.

In the embodiment shown, a target mark 16 is provided which is mirrored into the plane of the image via a target mark projector 17 and a divider cube 18. The front objective 7 and the deflection element 9 are fastened in an objective turret, indicated schematically at 101. The objective turret is guided in precision ball bearings. In this way, the precision of the target lines is assured with all enlargements of the daylight-viewing and the heat-picture optical systems.

Figure 1B:
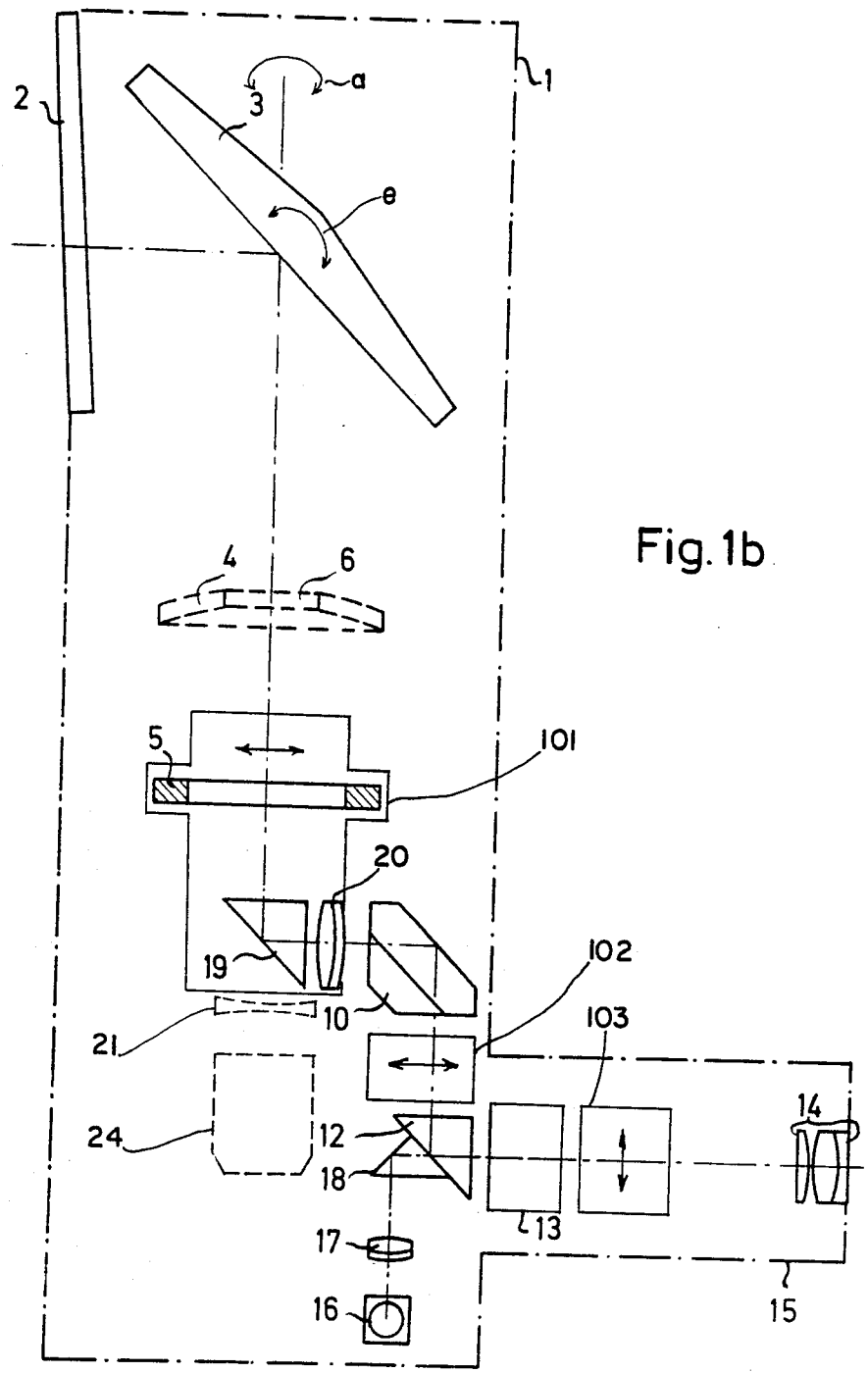
FIG. 1b shows the periscope with the strongly magnifying daylight-viewing optical system.

In order to produce the strong magnification in the daylight-viewing optical system, the objective turret is turned so that the components 7 and 9 (FIG. 1a) are removed from the light beam path and so that a 90° deviating prism 19, together with a front objective 20 lying behind it, comes into the path of the beam as seen in FIG. 1b. At the same time, the erecting lens system 11a, 11b is swung out and the Schmidt prism 13 is turned forwards by 90° so as to obtain an erect image. The rectangles 102 and 103 surrounding the components 11a and 11b in FIG. 1a are intended to represent schematically the moveable mounts or carriers for these elements, and the arrows within these rectangles indicate visually that these mounts are movable to swing the respective components into the light beam, as in FIG. 1a, or out of the light beam, as in FIG. 1b where the same rectangles are empty. When the Schmidt prism 13 is turned as mentioned above, it then has the new appearance shown at 13 in FIG. 1b.

Figure 2A:
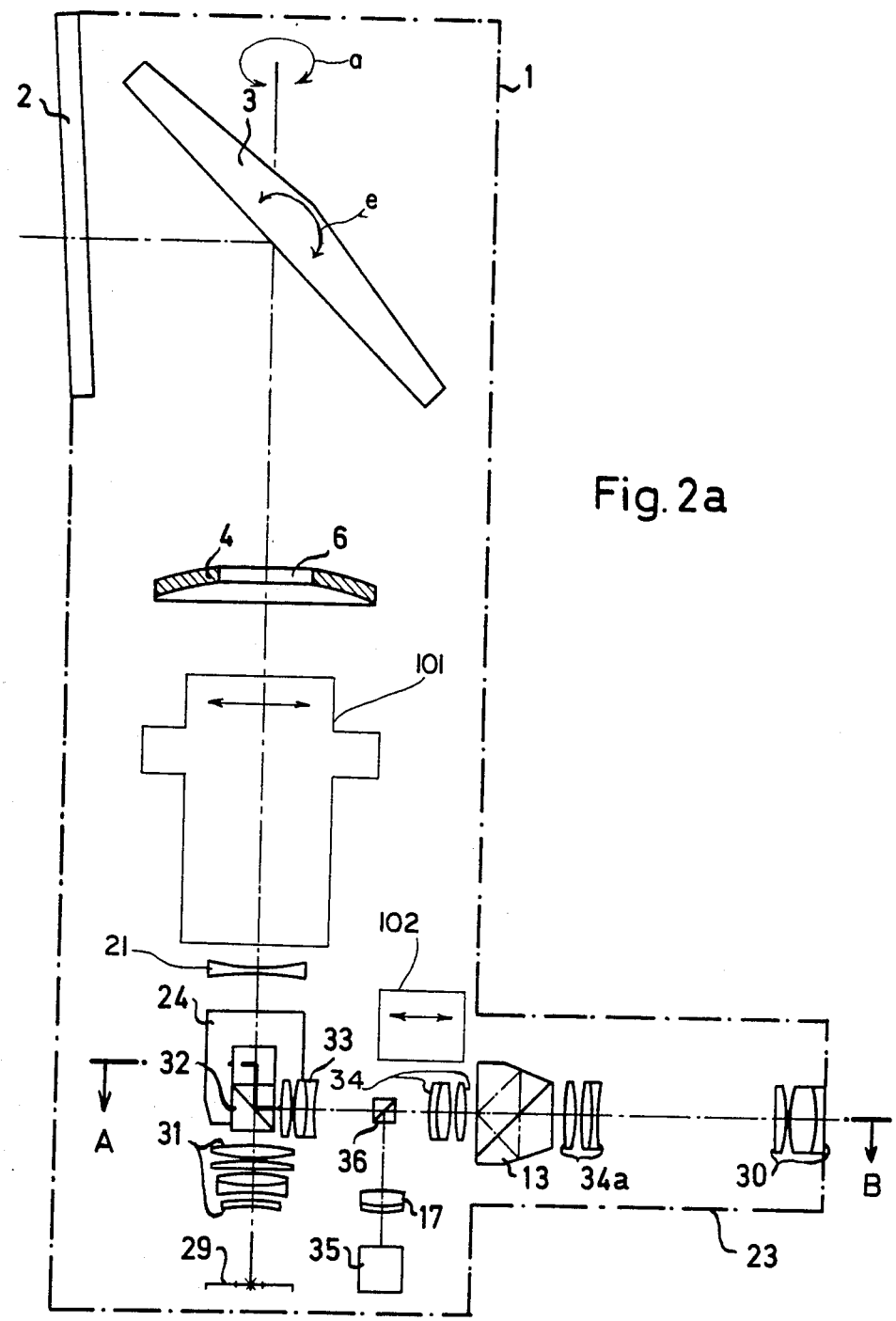
FIG. 2a is a section through the periscope showing the strongly magnifying heat-picture optical system.
Figure 2B:
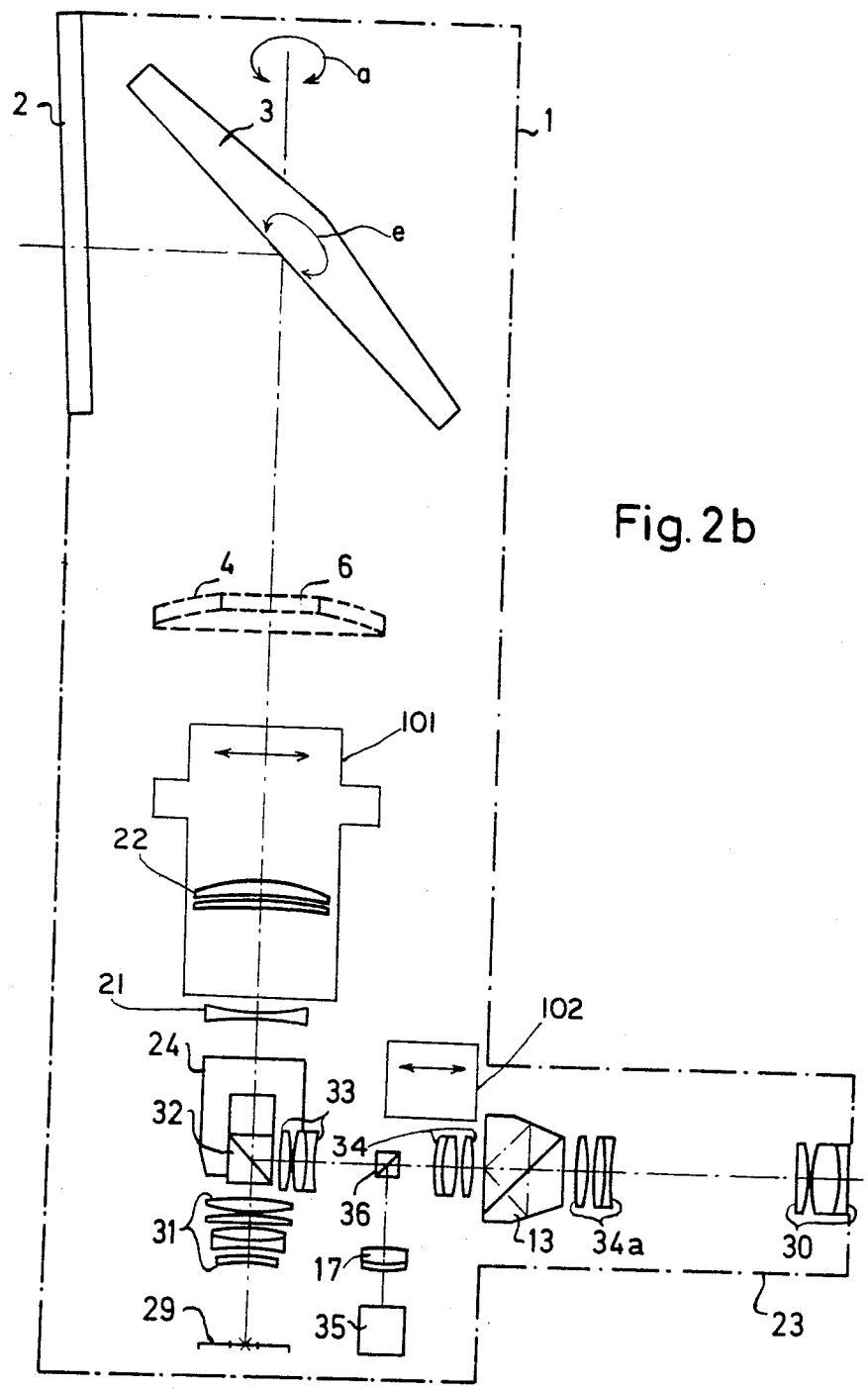
FIG. 2b is a section through the periscope showing the weakly magnifying heat-picture optical system.
Figure 2C:
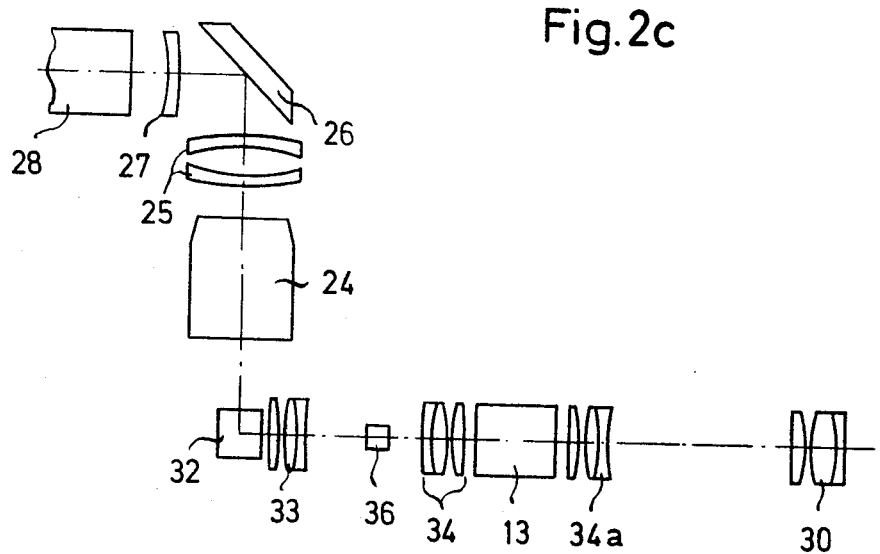

In the case of the heat-picture optical system shown in FIGS. 2a, 2b, and 2c, the infrared radiation coming from the target passes through the front window 2 onto the reflector mirror 3 which deflects the radiation to the perforated front objective 4 of an infrared Galilean telescope. In the case of the heat-picture optical system for large magnification shown in FIG 2a, the diverging objective 21 belongs to this Galilean telescope. For switching to weak magnification, an objective 22 (FIG. 2b) arranged in the objective turret 101 is swung into the ray path and in its turn forms a second Galilean telescope with the diverging objective 21. This Galilean telescope uses the hole 6 as entrance pupil and the lens 4 as aperture stop. The arrangement of the objectives in the Galilean telescope system excludes any interaction of the imaging in the different magnification scales.

How the target radiation emerging from the switchable Galilean telescope is used for the further development of the image can be noted from FIG. 2c, which represents a section along the line A—B of FIG. 2a. In the optomechanical scanner 24, which is developed, for instance, as a swivel mirror, a two-dimensional scanning of the image field takes place. Behind the swing mirror 24 there is arranged an IR imaging objective 25 and a 90° deflection mirror 26 which is followed by another IR condenser lens 27. The IR radiation passes, focused, onto the radiation-sensitive screen of an IR detector 28, which feeds a light emitting-diode array 29, visible in FIG. 2a. The observing of the image projected by the light emitting diode array 29 is effected via a telescope magnifier 30 arranged in the left ocular support 23 of a binocular tube, said magnifier having the preceding observation and deflection elements 31–34. 13 is a Schmidt prism also arranged in the observation beam path of the heat picture, this prism serving for the correction of the image tumbling upon azimuth rotation of the reflector head. A target mark 35 is provided also for the heat-picture beam path, said target mark being reflected into the ocular image plane via a target-mark projector 17 and a deflecting element 36.

The components 4, 21, and 24, although physically present, do not participate in production of the daylight images, and therefore they have been shown in broken lines in FIGS. 1a and 1b, to avoid confusion.

What is claimed is:

1. A panoramic periscope with daylight viewing and heat-picture optical systems, comprising
   (a) a front window (2) for incoming rays, said front window being transparent both to rays of a visible spectral region for daylight-viewing and to rays of a spectral region for producing a thermal image,
   (b) a reflector mirror (3) behind said window in position to receive and reflect entering rays in both of said spectral regions, said mirror being movable both in elevation and in azimuth,
   (c) a daylight-viewing optical system,
   (d) a heat-picture optical system selectively shiftable to at least two different magnifications,
   (e) said heat-picture optical systems having a front lens (4) effective at a first magnification of said heat-picture system, said front lens having a central hole,
   (f) said hole serving as an entrance pupil when said heat-picture system is operating at a second magnification,
   (g) said hole also allowing passage of light in a visible spectrum during daylight-viewing,
   (h) observation means including two oculars,
   (i) means for directing rays of said visible spectral region into one of said oculars (15) for daylight-viewing of a scene, and
   (j) means for directing rays of said thermal image spectral region into the other of said oculars (23) for viewing a heat-picture image produced by said rays.

* * * * *